US010179636B2

(12) United States Patent
Julliand et al.

(10) Patent No.: US 10,179,636 B2
(45) Date of Patent: Jan. 15, 2019

(54) PROPULSION UNIT FOR AN AQUATIC VEHICLE HAVING A MOBILE CASING AND A HYDRAULIC FLUID CONDITIONING MODULE

(71) Applicant: GE Energy Power Conversion Technology Ltd, Warwickshire (GB)

(72) Inventors: Lionel Julliand, Belfort (FR); Loïc Vincent, Belfort (FR)

(73) Assignee: GE ENERGY POWER CONVERSION TECHNOLOGY LTD, Warwickshire (GB)

( * ) Notice: Subject to any disclaimer, the term of this patent is extended or adjusted under 35 U.S.C. 154(b) by 49 days.

(21) Appl. No.: 15/497,037

(22) Filed: May 25, 2017

(65) Prior Publication Data

US 2018/0251200 A1 Sep. 6, 2018

(30) Foreign Application Priority Data

Apr. 25, 2016 (EP) ..................................... 16305477

(51) Int. Cl.
*B63H 5/125* (2006.01)
*B63H 25/42* (2006.01)
(Continued)

(52) U.S. Cl.
CPC ............. *B63H 5/125* (2013.01); *B63H 25/42* (2013.01); *F16C 19/26* (2013.01);
(Continued)

(58) Field of Classification Search
CPC ........ B63H 25/42; B63H 5/125; B63H 21/38; B63H 23/00; B63H 23/32; B63H 23/321; F16C 21/00
(Continued)

(56) References Cited

U.S. PATENT DOCUMENTS 6,790,109 B1 *  9/2004  Heer ...................... B63H 5/125
                                                              440/6
9,868,498 B2 *  1/2018  Aasebo .................. B63H 25/42
                        (Continued)

FOREIGN PATENT DOCUMENTS

WO     2009/127774 A1    10/2009

OTHER PUBLICATIONS

Extended European Search Report and Opinion issued in connection with corresponding EP Application No. 16305477.8 dated Oct. 31, 2016.

*Primary Examiner* — Lars A Olson
(74) *Attorney, Agent, or Firm* — GE Global Patent Operation; Scott R. Stanley

(57) ABSTRACT

This propulsion unit for an aquatic vehicle consists of a mobile casing equipped with an azimuth bearing due to its mounting in a pivot connection in relation to a hull element of the aquatic vehicle, the azimuth bearing having a closed volume provided to contain a hydraulic fluid, the propulsion unit having a drive shaft of a propeller, said shaft being mounted rotatably within the mobile casing by means of at least one bearing having a closed space adapted to contain a hydraulic fluid, an electrical machine being adapted to drive the rotary drive shaft in relation to the mobile casing, the propulsion unit having a supply circuit adapted to supply the closed space of the shaft bearing with hydraulic fluid.
The supply circuit has a supply duct connecting the closed space of the shaft bearing and the closed volume of the azimuth bearing.

15 Claims, 2 Drawing Sheets

(51) Int. Cl.
*F16C 19/26* (2006.01)
*F16C 33/66* (2006.01)

(52) U.S. Cl.
CPC .. *F16C 33/6659* (2013.01); *B63H 2005/1258* (2013.01); *F16C 2360/00* (2013.01)

(58) Field of Classification Search
USPC .................................................. 440/75, 88 L
See application file for complete search history.

(56) References Cited

U.S. PATENT DOCUMENTS

2004/0214484 A1* 10/2004 Ylitalo .................... B63H 5/125
 440/6
2005/0009418 A1* 1/2005 Ries ....................... B63H 5/125
 440/6

* cited by examiner

PROPULSION UNIT FOR AN AQUATIC VEHICLE HAVING A MOBILE CASING AND A HYDRAULIC FLUID CONDITIONING MODULE

BACKGROUND TO THE INVENTION

This invention relates to the field of propulsion units for aquatic vehicles, such as ships, submarines, or oil platforms.

These propulsion units, also known as "Propulsion-Oriented Drive" or "POD", generally consist of a mobile casing mounted in a pivot connection in relation to a hull element of the aquatic vehicle. The hull element may be e.g. the stern or the prow of a ship. The propulsion unit consists of a propulsion element, which may be e.g. a propeller, integral with a drive shaft rotatably mounted inside the mobile casing and capable of being rotated by means of an electrical machine.

BRIEF DESCRIPTION OF THE INVENTION

In order to provide the pivot connection between the mobile casing and the hull element, the propulsion unit consists of at least one rotary azimuth bearing. To limit friction, the azimuth bearing generally consists of a closed volume containing a hydraulic fluid, such as oil or water.

In addition, rotary shaft bearings can be used to enable the drive shaft to rotate relative to the mobile casing. These shaft bearings are mounted between the drive shaft and the mobile casing and may include a closed space also containing a hydraulic fluid, such as oil or water. Sealing devices, such as sealing gaskets, delimit these closed spaces and have the function of preventing leakage of hydraulic fluid from said closed spaces.

The shaft bearings are often subjected to high stresses, in particular when the rotation of the drive shaft and the propulsion element occurs over long periods of time. These stresses result in heating of the hydraulic fluid contained in the closed space and the loss of its lubricating properties. This results in premature wear on the shaft bearings.

To overcome this disadvantage, a module for conditioning the hydraulic fluid contained in the closed space of the shaft bearing may be provided. The conditioning module is generally designed so as to be able to draw hydraulic fluid into the closed spaces of the shaft bearings, to be able to condition the hydraulic fluid drawn off and then supply the closed space of the shaft bearings with the conditioned hydraulic fluid.

Given the clutter it causes, the conditioning module is generally arranged outside the mobile casing and inside the aquatic vehicle. Circuits are then provided for fluidly connecting the closed space of the shaft bearings to the conditioning module. These circuits are in the form of ducts having a part contained in the mobile casing and connected to a closed space of a shaft bearing, and a part contained in the aquatic vehicle outside the mobile casing and connected to the conditioning module. One difficulty lies in the fact that such a duct is present in two parts that are mobile relative to one another. To overcome this difficulty, the duct generally passes inside the azimuth bearing.

For each shaft bearing, two ducts separated from one another are generally required, a first duct being provided to convey the hydraulic fluid from the closed space toward the conditioning module, and a second duct being provided to convey the hydraulic fluid in the opposite direction.

The solution consisting of using a conditioning module thus has the disadvantage of causing significant clutter, this drawback being all the more important when the conditioning module is connected to the closed spaces of the shaft bearings by ducts passing through the inside of the azimuth bearing. Another disadvantage is that the use of a conditioning module connected to the closed spaces of the shaft bearings by ducts of significant length leads to the appearance of an overpressure within the closed spaces of the shaft bearings. This generally results in less efficient operation and premature wear of the sealing devices delimiting said closed spaces.

An object of embodiments of this invention is to overcome these disadvantages.

More particularly, embodiments of this invention aim to provide a propulsion unit for conditioning the hydraulic fluid used to lubricate the shaft bearings, which causes limited clutter and a simplified design, while limiting the appearance of an overpressure within the spaces containing this hydraulic fluid.

According to a first aspect of the invention, a propulsion unit is proposed for an aquatic vehicle having a mobile casing provided with an azimuth bearing having a closed volume intended to contain a hydraulic fluid, a drive shaft mounted rotatably on the interior of the mobile casing by means of at least one shaft bearing having a closed space for containing a hydraulic fluid, an electrical machine being adapted to drive the drive shaft in rotation in relation to the mobile casing, the propulsion unit further having a supply circuit adapted to supply the closed space of the shaft bearing with hydraulic fluid.

According to a general characteristic of this propulsion unit, the supply circuit consists of a supply duct connecting the closed space of the shaft bearing and the closed volume of the azimuth bearing.

By using such a supply duct, hydraulic fluid from the azimuth bearing can be supplied to the shaft bearing. In this way, cooled hydraulic fluid is injected into the closed space of the shaft bearing, which can replace the conditioning by means of a conditioning module and a duct directly connecting the closed space to the conditioning module.

According to one embodiment, the azimuth bearing is provided for mounting the propulsion unit in a pivot connection in relation to a hull element of the aquatic vehicle, the drive shaft being intended to permit the driving of a propulsion element. The propulsion element may be e.g. a propeller or a pump rotor.

In an embodiment, the propulsion unit consists of a discharge circuit adapted to draw hydraulic fluid from the closed space, the discharge circuit having a discharge duct connecting the closed space of the shaft bearing and the closed volume of the azimuth bearing.

It is thus possible to install a circulation loop between the closed volume of the azimuth bearing and the closed space of the shaft bearing so as to allow a continuous supply of cooled hydraulic fluid in the closed space of the shaft bearing.

In some cases, the injection of hydraulic fluid from the closed volume of the shaft bearing may prove insufficient to maintain the hydraulic fluid of the shaft bearing under good conditions.

It is then possible to provide a hydraulic fluid conditioning module located in the aquatic vehicle and outside the mobile casing and having a cooler and a circulation pump capable of generating a flow of hydraulic fluid from the closed volume through the cooler and then toward the closed volume.

The conditioning of the hydraulic fluid contained in the closed space of the shaft bearing and the closed volume of the azimuth bearing is thus implemented by means of a single hydraulic fluid conditioning module. In addition, by using a duct connecting the closed space of the shaft bearing and the closed volume of the azimuth bearing and a conditioning module connected to the closed volume of the azimuth bearing, it is possible to condition the hydraulic fluid used to lubricate the shaft bearings by avoiding the need to pass ducts inside the azimuth bearing or to install ducts in two parts which are mobile relative to one another.

In another embodiment, the closed volume of the azimuth bearing consists of a rolling space extending radially between an inner ring integral with the mobile casing and an outer ring integral with the hull element of the aquatic vehicle and having a number of rolling elements.

In one embodiment, a hydraulic pump is mounted on the supply duct.

In another embodiment, the discharge circuit consists of a discharge duct connecting the closed space of the shaft bearing and the closed volume of the azimuth bearing, a hydraulic pump being mounted on the discharge duct.

It is also possible to provide that the closed space of the shaft bearing is at least partially delimited by a thermally conductive wall of the mobile casing, said thermally conductive wall having a surface in contact with the outside of the mobile casing.

According to one embodiment, at least one of the supply and/or discharge ducts is at least partially delimited by a thermally conductive wall having a surface in contact with the outside of the mobile casing.

Advantageously, the closed volume of the azimuth bearing is at least partially delimited by a thermally conductive wall having a surface in contact with the outside of the mobile casing.

The thermally conductive wall may then be made of a metal material and have an average thickness of between 20 mm and 300 mm.

It is also possible to provide means for injecting pressurized air inside the mobile casing.

It is also possible to provide means for injecting pressurized air inside the closed volume.

In an advantageous embodiment, the propulsion unit consists of two shaft bearings mounted on the drive shaft on either side of the electrical machine, each shaft bearing having a closed space, the drive circuit having a first supply duct connecting the closed space of one of the shaft bearings to the closed volume of the azimuth bearing, a second supply duct connecting the closed space of the other shaft to the closed volume of the azimuth bearing, the first supply duct and the second supply duct having a common portion, a hydraulic pump being mounted on the common portion.

In an embodiment, the common portion extends between the closed volume of the azimuth bearing and a bifurcation point, the first supply duct forming a portion between the bifurcation point and the separate closed space of the second supply duct.

In another embodiment, one end of the drive shaft is intended to be equipped with a propulsion element, the closed space of the shaft bearing which is located between the electrical machine and the opposite end being at least partially delimited by a thermally conductive wall of the mobile casing, said thermally conductive wall being a front wall of the mobile casing and having a surface in contact with the outside of the mobile casing.

The propulsion element may alternatively be a propeller or a pump rotor. The end of the shaft which is intended to be equipped with a propulsion element can, for this purpose, extend axially from the shaft bearing adjacent to it further than the other end extends, so as to present a cylindrical surface for fixing the propulsion element.

BRIEF DESCRIPTION OF THE DRAWINGS

Other objects, characteristics and advantages of embodiments of the invention will become apparent on reading the following description, given solely by way of non-limiting example, with reference to the accompanying drawings, in which:

FIG. 1 shows a propulsion unit 2 incorporated into a ship (not shown). The propulsion unit 2, in particular, consists of a mobile casing 3 which projects outward toward the exterior from a hull element 4 of the ship, in this case the stern of the ship. With reference to FIG. 1, the space located above the hull element 4 corresponds to the internal volume of the hull, while the space located below it corresponds to the external volume of the hull 4.

DETAILED DESCRIPTION OF THE INVENTION

Figure 1:
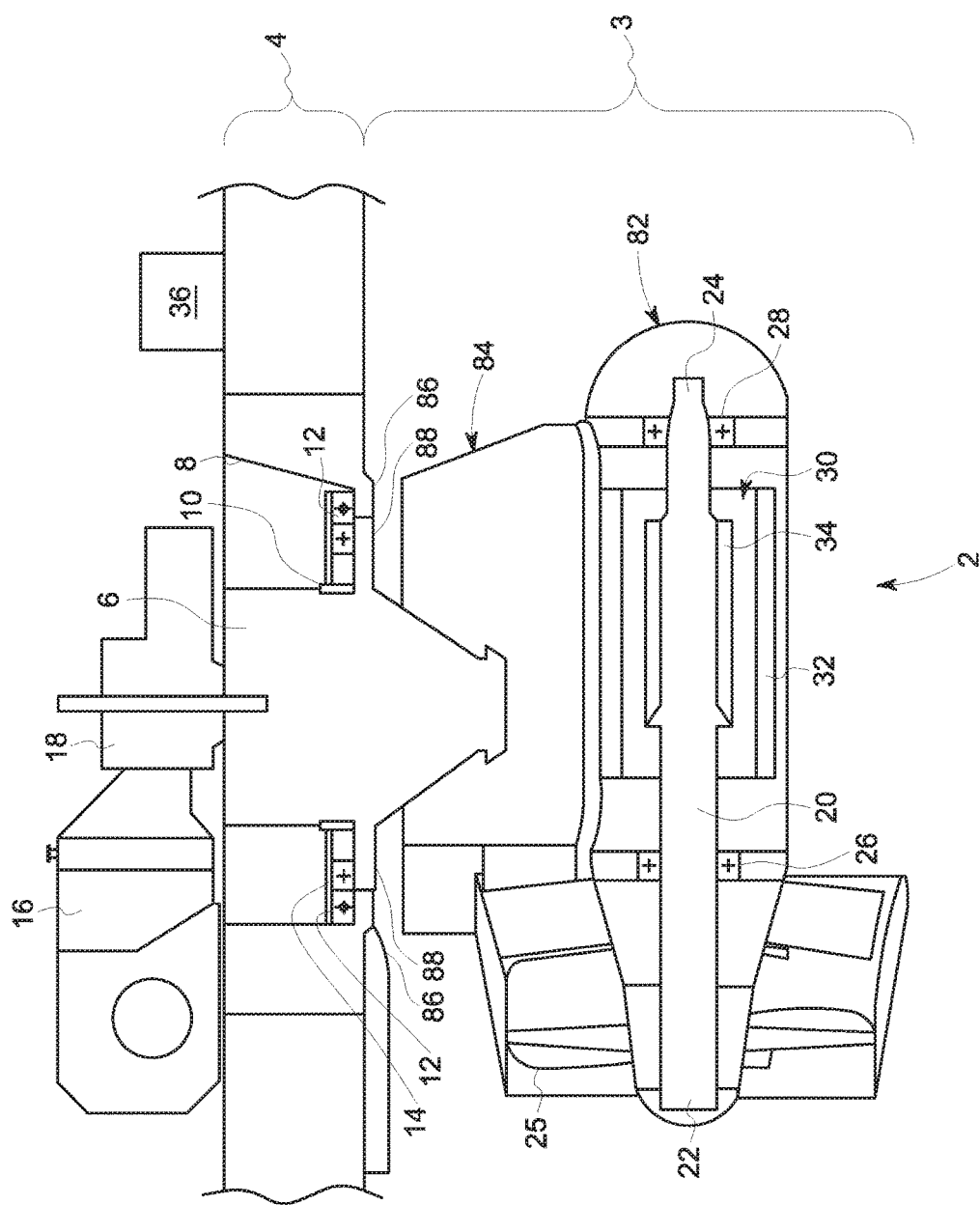
FIG. 1 schematically shows a propulsion unit according to an embodiment of the invention.

The propulsion unit 2 consists of an upper part 6 integral with the mobile casing 3 and inserted inside a bore 8 made in the hull element 4. The upper part 6 consists of a cylindrical portion 10. The bore 8 consists of a cylindrical portion 12 located facing the cylindrical portion 10. A rotary azimuth bearing 14 is arranged between the cylindrical portions 10 and 12. The azimuth bearing 14 may be e.g. a roller bearing having an inner ring (not shown) integral with the cylindrical portion 10, and an outer ring (not shown) integral with the cylindrical portion 12. A bearing space (not shown) is defined, radially located between the cylindrical portions 10 and 12. Within the bearing space are bearing elements (not shown), which may be rollers, balls or needles.

Alternatively, without departing from the scope of the invention, it is possible to envisage an azimuth bearing with a different design. For example, the azimuth bearing 14 may include bearing bushes. According to such a design, the bearing 14 consists of an inner annular part integral with the cylindrical portion 10 and an outer annular part integral with the cylindrical portion 12, the inner annular part and the outer annular part being directly in contact or almost in contact with one another.

By means of the azimuth bearing 14, the propulsion unit 2 can pivot about the yaw axis of the ship, in order to orient the propulsion. A motor 16, in this case an electrical machine, is arranged inside the hull element 4 and associated with a transmission element 18 in order to drive the upper part 6 and the mobile casing 3 in rotation.

A drive shaft 20 mounted inside the mobile casing 3 has a first end 22 and a second end 24, opposite the first end 22. A propeller 25 is mounted on the first end 22 and extends radially in relation to the axis of the shaft 20. Although, in the illustrated embodiment, a propeller is used to provide the propulsion, it is not outside the scope of the invention to consider any other type of propulsion element, e.g. a pump rotor. The shaft 20 is rotatably mounted in relation to the mobile casing 3, and in this regard consists of rotary shaft bearings. In this case, a first shaft bearing 26 is provided, located near the first end 22 and a second shaft bearing 28, located near the second end 24. By means of the shaft bearings 26 and 28, the drive shaft 20 and the propeller 25 can be driven in rotation about the axis of the shaft 20, in relation to the mobile casing 3.

In the illustrated embodiment, the shaft bearings 26 and 28 are roller bearings, each having an inner ring (not shown) integral with the shaft 20, and an outer ring (not shown) integral with the mobile casing 3. A bearing space (not shown) is defined and radially delimited by the inner ring and the outer ring. A number of bearing elements (not shown) is arranged within the bearing space. The bearing elements may, in particular, be balls, rollers or even needles. As for the azimuth bearing 14, it is possible, without departing from the scope of the invention, to envisage that the shaft bearings 26 and 28 are bearings with a different design, e.g. bush bearings.

An electrical machine 30 is provided to drive the shaft 20 and the propeller 25 in rotation. The electrical machine 30 is arranged axially between the shaft bearing 26 and the shaft bearing 28. The electrical machine 30 consists of a stator 32 integral with the mobile casing 3 and a rotor 34 integral with the drive shaft 20.

A hydraulic fluid, e.g. oil, is introduced into the bearing space of the azimuth bearing 14, the shaft bearing 26 and the shaft bearing 28 in order to limit the friction between the inner ring, the outer ring and the bearing elements. In addition, the same hydraulic fluid is used to lubricate each of the bearings 14, 26 and 28. In the case where one of the bearings 14, 26 and 28 is a bush bearing, the hydraulic fluid is used to create a thin thread of lubricating fluid between the rings almost in contact with one another.

A hydraulic fluid conditioning module 36 is provided inside the hull element 4. The function of the conditioning module 36 is to ensure the conditioning of the hydraulic fluid used to lubricate the bearings 14, 26 and 28, so that this hydraulic fluid continues to have good lubricating properties.

In an embodiment, the conditioning module 36 includes means for cooling the hydraulic fluid. The conditioning module 36 may consist e.g. of a heat exchanger, by means of which the hot hydraulic fluid can be cooled by a cooling liquid circulating in an independent cooling circuit. The conditioning module 36 may also consist of a circulation pump coupled to a motor for circulating the hydraulic fluid in the heat exchanger.

Figure 2:
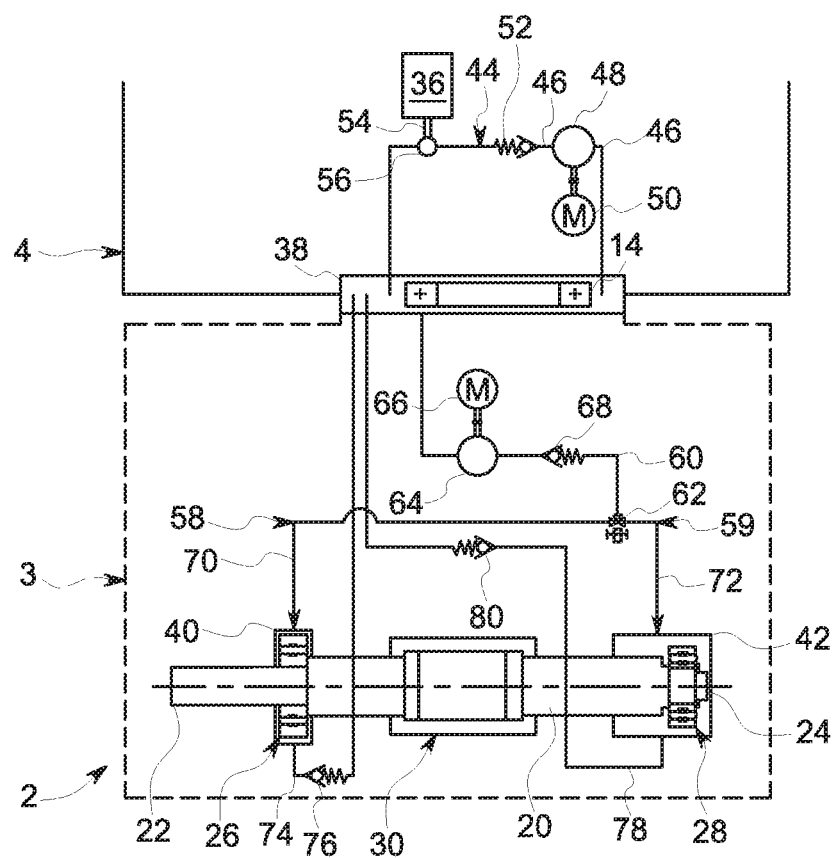
FIG. 2 is a hydraulic diagram of the propulsion unit of FIG. 1.

FIG. 2 is a hydraulic diagram illustrating the exchanges of hydraulic fluid between the bearings 14, 26 and 28 and the conditioning module 36.

A closed volume 38 is provided and is at least partially located inside the hull element 4 and/or the mobile casing 3 in order to contain the hydraulic fluid used to lubricate the azimuth bearing 14. The closed volume 38 contains the bearing space of the azimuth bearing 14. The closed volume 38 is sealed by means of gaskets (not shown).

A closed space 40 is provided inside the mobile casing 3 in order to contain the hydraulic fluid used to lubricate the shaft bearing 26. In the same way as the closed volume 38, the closed space 40 contains the bearing space of the shaft bearing 26. The closed space 40 is sealed by means of gaskets (not shown).

In the same way, a closed space 42 is provided inside the mobile casing 3 in order to contain the hydraulic fluid used to lubricate the shaft bearing 28. To this end, the closed space 42 contains the bearing space of the shaft bearing 28. The closed space 42 is also sealed by means of sealing gaskets (not shown).

In order to ensure the conditioning of the hydraulic fluid contained in the closed volume 38 by the conditioning module 36, a conditioning loop 44 is provided. The conditioning loop 44 is located inside the hull element 4 and has a duct 46. The duct 46 is fluidically connected at each of its ends to the closed volume 38. A pump 48 is mounted on the duct 46 and is mechanically coupled to a motor 50, so as to be able to generate a flow of hydraulic fluid inside the duct 46. A non-return valve 52 is mounted on the duct 46, so that the flow of hydraulic fluid inside the duct 46 can be generated only in one direction (from right to left in FIG. 2). In addition, a branch 54 coupled to a selective valve 56 is mounted on the duct 46. The branch 54 and the valve 56 make it possible to draw hydraulic fluid circulating inside the duct 46, to supply the hydraulic fluid thus drawn to the conditioning module 36 to condition it, and finally to return the hydraulic fluid conditioned by the module 36 to the duct 46.

Thus, through the conditioning module 36 and the conditioning loop 44, the hydraulic fluid contained in the closed volume 38 of the azimuth bearing 14 can be drawn by the duct 46, conditioned by the conditioning module 36 and finally returned to the closed volume 38. In addition, the duct 46 of the conditioning loop 36 is integrally located inside the hull element 4.

Inside the mobile casing 3, a number of circuits are provided connecting the closed spaces 40 and 42 with the closed volume 38. More particularly, for each closed space 40 and 42, a supply circuit and a circuit for discharging the hydraulic fluid are provided respectively. The supply circuit is designed so as to be able to supply hydraulic fluid from the closed volume 36 to the corresponding closed space 40, 42. In contrast, the discharge circuit is provided in order to draw hydraulic fluid from the corresponding closed space 40, 42 and return it to the closed volume 38.

The supply circuit of the closed space 40 of the shaft bearing 26 consists of a supply duct 58. The supply duct 58 is, on the one hand, connected to the closed volume 38 and, on the other hand, is connected to the closed space 40. Similarly, the supply circuit of the closed space 42 of the shaft bearing 28 consists of a supply duct 59, being, on the one hand, connected to the closed volume 38 and, on the other hand, connected to the closed space 42. The duct 58 consists of means for circulating, in one direction, the hydraulic fluid from the closed volume 38 toward the closed space 40. Similarly, the duct 59 consists of means for circulating, in one direction, the hydraulic fluid from the closed volume 38 toward the closed space 42.

In the embodiment shown in FIG. 2, the ducts 58 and 59 consist of a common portion 60. The common portion 60 extends from the closed volume 38 to a three-way valve 62. A pump 64 mechanically coupled with a motor 66 is mounted on the common portion 60. A non-return valve 68 is mounted on the common portion 60, between the pump 64 and the three-way valve 62. The valve 68 restricts the direction of circulation of the hydraulic fluid within the common portion 60 in one direction from the closed volume 38 toward the three-way valve 62 (from left to right and from top to bottom in FIG. 2). Thus, the common portion 60 is located upstream of the three-way valve 62.

Downstream of the three-way valve 62, the duct 58 consists of a portion 70 extending from the three-way valve 62 to the closed space 40. Similarly, downstream of the three-way valve 62, the duct 59 consists of a portion 72 extending from the three-way valve 62 to the closed space 42. Thus, the respective portions 70 and 72 of the ducts 58 and 59, which are located downstream of the three-way valve 62, are totally separate from one another.

Although a three-way valve is used in the illustrated embodiment to distribute the hydraulic fluid of the common portion into the separate portions, without departing from the scope of the invention, it is possible to envisage any other type of distribution member, such as another pilot valve, a pilot flap, a pilot distributor, etc.

In view of the above, in this embodiment, the supply circuits of the closed spaces 40 and 42 consist of a common portion and a separate portion. The common portion, in an embodiment, has the particular advantage of reducing the overall clutter and design costs, it being understood that a single pump and a single non-return valve are required. However, alternatively, without departing from the scope of the invention, it is possible to envisage respective supply circuits for the closed spaces 40 and 42 which are totally separate from one another. In such an embodiment, each supply circuit of a closed space 40, 42 consists of a separate duct connecting the closed volume 38 to the corresponding closed space 40, 42, a pump and a non-return valve being arranged on each of the ducts. Such an alternative embodiment, if it causes greater clutter and requires a more advanced design, makes it possible to control more finely the exchanges of hydraulic fluid between the closed volume 38 and the closed spaces 40 and 42.

The discharge circuit of the closed space 40 of the shaft bearing 26 consists of a discharge duct 74, fluidically connected, on the one hand, to the closed space 40 and, on the other hand, to the closed volume 36. A non-return valve 76 is arranged on the duct 74, so that the hydraulic fluid can only circulate in the discharge duct 74 in one direction, from the closed space 40 toward the closed volume 38.

Similarly, the discharge circuit of the closed space 42 of the shaft bearing 28 consists of a discharge duct 78, fluidically connected, on the one hand, to the closed space 42 and, on the other hand, to the closed volume 38. The circuit 78 includes a non-return valve 80, mounted so that the hydraulic fluid can only circulate in the discharge duct 78 in one direction, from the closed space 42 toward the closed volume 38.

In this way, for each of the closed spaces 40, 42, the supply circuit and the discharge circuit put in place an exchange loop for the hydraulic fluid with the closed volume 38. This exchange is controlled by the motor 66 and the three-way valve 62. In particular, by controlling the three-way valve 62, the motor 66 and the conditioning loop 44 suitably, it is possible to supply the closed space 40 and/or 42 with hydraulic fluid from the conditioning module 36 and to discharge the hydraulic fluid from the closed space 40 and/or 42 to return it to the module 36 for conditioning.

In this embodiment, the mounting of the pump on the supply circuits 58 and 59 may be advantageous in that it makes it possible to place the pump in the upper part of the propulsion unit between the hull element 4 and the drive shaft 20, consisting of more free space. Without departing from the invention, it would be possible to envisage an alternative embodiment in which the discharge ducts consist of a common portion and separate portions. In this alternative embodiment, the pump would be mounted on the common portion of the discharge ducts, and would thus operate with the suction of the hydraulic fluid contained in the closed spaces 40 and 42, and not with backflow. Thus, such an alternative embodiment has the advantage of being able to reduce the pressure of the hydraulic fluid in the closed spaces 40 and 42 so as to preserve the lifespan of the sealing devices delimiting the closed spaces 40 and 42. However, this arrangement is more difficult to implement, given that the pump and the associated motor must be installed in the lower part of the propulsion unit located beneath the drive shaft 20. This lower part contains less free space for arrangement of the pump and motor.

In order to further facilitate the cooling of the hydraulic fluid, the closed spaces 40 and 42 are in an embodiment arranged close to the walls intended to be in contact with the seawater. In the embodiment illustrated in FIG. 1, these walls are those that delimit the mobile casing 3 and/or the propulsion unit 2. This arrangement is advantageous insofar as these walls consist of a surface in contact with seawater. They cool the hydraulic fluid contained in the closed spaces 40 and 42. To benefit fully from this advantage, the closed spaces 40 and 42 are delimited at least partially by walls defining the mobile casing 3. In the particular embodiment illustrated in FIG. 1, the closed space 42 of the shaft bearing 28 is partially delimited by the front wall 82 of the mobile casing 3.

In the same way, the ducts 58, 59, 74 and 78 may be at least partially delimited by a wall of the mobile casing 3. Thus, in the embodiment illustrated in FIG. 1, the common portion 60 is partially delimited by the front wall 84 of the mobile casing 3.

Similarly, the closed volume 38 may be arranged so that it is at least partially delimited by a wall intended to be in contact with seawater. In the case of the closed volume 38, this wall may be a wall of the hull element 4 or the mobile casing 3. In the embodiment illustrated in FIG. 1, the closed volume 38 is partially delimited by the respective surfaces 86 and 88 of the hull element 4 and the mobile casing 3.

Thus, according to this arrangement, the spaces, volume and ducts containing hydraulic fluid 40, 42, 58, 59, 74, 78 and 38 are partially delimited by walls cooled by seawater. This results in the cooling of the hydraulic fluid independently of the operation of the conditioning module 36. When these walls are front walls of the propulsion unit 2 and axially opposite to the propeller 25, as is the case for wall 82 or wall 84, the seawater coming into contact with the surface of the wall is at a higher pressure. The cooling is then made even more efficient.

In an embodiment, these walls are made of a thermally conductive material, e.g. a metal material such as steel, stainless steel or even a copper alloy. To further increase the thermal conductivity while maintaining good solidity of the mobile casing 3, the walls 86 and 88 delimiting the enclosed volume 38 have an average thickness of between 50 mm and 300 mm, and the walls 82 and 84 delimiting respectively the closed space 42 and the common portion have an average thickness of between 20 mm and 70 mm.

To improve the sealing between the inside and outside of the mobile casing 3, pressurized air may be injected. Doing so reduces the pressure differential between the internal volume of the mobile casing 3 and the static pressure of the seawater in the propulsion unit 2.

In an embodiment, the drive unit 2 also includes means for injecting pressurized air into the closed volume 38 of the azimuth bearing 14*m*, so as to artificially increase the hydraulic fluid pressure inside the closed spaces 40 and 42 of the shaft bearings 26 and 28 in order to drain them. The pressure of the hydraulic fluid in the closed spaces 40 and 42 can also be balanced with the pressure outside the mobile casing 3, e.g. the pressure of the seawater, so as to improve the sealing of the closed spaces 40 and 42.

Additionally, or alternatively, the propulsion unit may have means for injecting pressurized air directly into the closed spaces 40 and 42 of the shaft bearings 26 and 28, so as to directly increase the hydraulic fluid pressure inside the closed spaces 40 and 42 in order to drain them.

In addition, the propulsion unit 2 has means for injecting pressurized air into the mobile casing 3. By injecting air in such a way, the internal pressure of the mobile casing 3 is balanced with the external pressure, e.g. the pressure of the seawater. This improves the sealing of the closed spaces 40 and 42.

By inserting a conditioning loop of the closed volume of the azimuth bearing 14 and an exchange loop between the respective closed spaces 40 and 42 of the shaft bearings 26 and 28 with the closed volume 38 of the azimuth bearing 14 it is possible to condition both the hydraulic fluid contained in the closed volume of the azimuth bearing and the hydraulic fluid contained in the closed spaces of the shaft bearings by means of the single conditioning module 36.

In addition, the conditioning loop 44 is completely contained within the hull element 4, the heat exchange loop consists of supply and discharge circuits of the closed spaces being integrally contained in the mobile casing 3. This avoids having to design and implement, as is conventionally required, a duct having a portion located inside the hull element 4 and a portion located inside the mobile casing 3. This helps reduce clutter and avoids the implementation of a complex design intended to overcome the difficulty of having ducts contained in two parts that are mobile relative to one another.

In addition, the use of ducts that do not pass through the inside of the azimuth bearing makes it possible to delimit its ducts, at least partially, by a wall in contact with the seawater, which allows for additional cooling of the hydraulic fluid circulating in it. This also applies to the closed volume 38 and the closed space 42.

By allowing additional cooling through the walls in contact with the seawater, it is possible to reduce the dimensions of the conditioning module 36, so as to reduce the clutter caused by the latter.

In the illustrated embodiment, a conditioning module is incorporated for conditioning the hydraulic fluid of the shaft bearings and the azimuth bearing to ensure the best possible operation of said bearings and to increase their lifetime. However, without departing from the scope of the invention, it is possible to consider an alternative embodiment in which the conditioning of the hydraulic fluid is performed entirely without using a conditioning module, e.g. by means of thermally conductive walls 82, 84, 86 and 88. While such an embodiment has the disadvantage of not optimizing the operation of the bearings as much as the embodiment illustrated in the figures, it has the advantage of allowing conditioning and making clutter caused in the aquatic vehicle almost nonexistent.

What we claim is:

1. A propulsion unit for an aquatic vehicle comprising:
    a mobile casing provided with an azimuth bearing comprising a closed volume containing a hydraulic fluid, a drive shaft mounted rotatably on the interior of the mobile casing by at least one shaft bearing having a closed space for containing a hydraulic fluid;
    an electrical machine to drive the drive shaft in rotation in relation to the mobile casing, the propulsion unit further having a supply circuit adapted to supply the closed space of the shaft bearing with hydraulic fluid; and
    wherein the supply circuit has a supply duct connecting the closed space of the shaft bearing and the closed volume of the azimuth bearing.

2. A propulsion unit according to claim 1, comprising a discharge circuit adapted to draw hydraulic fluid from the closed space of the shaft bearing, the discharge circuit having a duct connecting the closed space of the shaft bearing and the closed volume of the azimuth bearing.

3. A propulsion unit according to claim 1, comprising a hydraulic fluid conditioning module located in the aquatic vehicle and outside the mobile casing, and having a cooler and a circulation pump capable of generating a flow of hydraulic fluid from the closed volume through the cooler and then toward the closed volume.

4. A propulsion unit according to claim 1, wherein the closed volume of the azimuth bearing has a rolling space extending radially between an inner ring integral with the mobile casing and an outer ring integral with the hull element of the aquatic vehicle and having a number of rolling elements.

5. A propulsion unit according to claim 1, comprising a hydraulic pump mounted on the supply duct.

6. A propulsion unit according to claim 1, wherein the discharge circuit consists of a discharge duct connecting the closed space of the shaft bearing and the closed volume of the azimuth bearing, a hydraulic pump being mounted on the discharge duct.

7. A propulsion unit according to claim 1, wherein the closed space of the shaft bearing is at least partially delimited by a thermally conductive wall of the mobile casing, said thermally conductive wall having a surface in contact with the outside of the mobile casing.

8. A propulsion unit according to claim 1, wherein the supply duct and/or discharge duct connecting the closed space of the shaft bearing and the closed volume of the azimuth bearing is at least partially delimited by a thermally conductive wall having a surface in contact with the outside of the mobile casing.

9. A propulsion unit according to claim 1, wherein the closed volume of the azimuth bearing is at least partially delimited by a thermally conductive wall having a surface in contact with the outside of the mobile casing.

10. A propulsion unit according to claim 1, wherein the thermally conductive wall is made of a metal material and has an average thickness of between 20 mm and 300 mm.

11. A propulsion unit according to claim 1, comprising means for injecting pressurized air inside the mobile casing.

12. A propulsion unit according to claim 1, comprising means for injecting pressurized air inside the closed volume.

13. A propulsion unit according to claim 1, comprising two shaft bearings mounted on the drive shaft on either side of the electrical machine, each shaft bearing having a closed space, the supply circuit having a first supply duct connecting the closed space of one of the shaft bearings to the closed volume of the azimuth bearing, a second supply duct connecting the closed space of the other shaft bearing to the closed volume of the azimuth bearing, the first supply duct and the second supply duct having a common portion, a hydraulic pump being mounted on the common portion.

14. A propulsion unit according to claim 1, wherein the common portion extends between the closed volume of the azimuth bearing and a bifurcation point, the first supply duct forming a portion between the bifurcation point and the separate closed space of the second supply circuit.

15. A propulsion unit according to claim 1, wherein one end of the drive shaft is intended to be equipped with a propulsion element, the closed space of the shaft bearing located between the electrical machine and the opposite end being delimited at least partially by a thermally conductive front wall of the mobile casing, said thermally conductive front wall having a surface in contact with the outside of the mobile casing.

* * * * *